SECRECY COMMUNICATION SYSTEM

Filed Feb. 27, 1959 4 Sheets-Sheet 1

INVENTOR
Walter S. Druz
BY James E. Tracy
ATTORNEY

May 9, 1961 W. S. DRUZ 2,983,782

SECRECY COMMUNICATION SYSTEM

Filed Feb. 27, 1959 4 Sheets-Sheet 2

INVENTOR
Walter S. Druz

BY James E. Tracy

ATTORNEY

INVENTOR
Walter S. Druz
BY James E. Tracy
ATTORNEY

United States Patent Office 2,983,782

Patented May 9, 1961

2,983,782

SECRECY COMMUNICATION SYSTEM

Walter S. Druz, Bensenville, Ill., assignor to Zenith Radio Corporation, a corporation of Delaware Filed Feb. 27, 1959, Ser. No. 796,026

13 Claims. (Cl. 178—5.1)

This invention pertains to a secrecy communication system wherein an intelligence signal is coded in accordance with a secret code schedule and transmitted to an authorized or subscriber receiver wherein it is decoded or unscrambled and thereby rendered intelligible. The system is particularly attractive when incorporated in a subscription television arrangement and for that reason is described in such an environment.

The invention may be practiced in either a transmitter or receiver and thus the term "encoding" is employed herein in its generic sense to encompass coding at the transmitter or decoding at the receiver.

Secrecy communication systems have been developed wherein scrambling is achieved by selectively transmitting the intelligence information to authorized receivers over at least two different transmitting channels, such as wire conductors, air links or the like, selected one at a time in accordance with a secret code pattern which is made known only to the authorized receivers. Such receivers operate in synchronism with the transmitter and select between the various channels in accordance with the same code pattern so that a single, continuous unscrambled intelligence signal is derived. This basic system suffers from an obvious lack of security against unauauthorized appropriation since in order to effectively "break" the code pattern it is only necessary to add the signals translated over all of the channels together and a continuous unscrambled signal is automatically developed.

Attempts have been made to overcome this shortcoming by inserting or introducing a masking or false signal in the form of noise on the channel or channels which are not conveying the true intelligence at any given instant. The masking signal is switched between the channels in accordance with the same code schedule, always appearing on the channels other than the one conveying the true information. A certain degree of camouflaging is accomplished since each individual channel contains spaced intervals or bursts of true information with intervening noise; thus, each individual channel may be made relatively unintelligible. By adding all of the channels, in an attempt to achieve unauthorized pirating, the entire intelligence is derived but it is completely masked by noise. However, the nature of the human ear is such that it is a simple matter to psychologically filter out the undesired noise or masking information and thus understand or appreciate the true information. The human mind merely must concentrate on the desired information and it will be understood. Consequently, employing noise as a masking signal for the plural-channel secrecy system has not provided an adequate degree of security.

The present invention represents a meritorious advance over such previous systems in that considerably enhanced security is obtained to the extent that no intelligibility can be discerned by an unauthorized person.

Accordingly, it is an object of this invention to provide a new and improved secrecy communication system.

It is another object of the present invention to provide an improvement in the prior art plural-channel secrecy systems.

It is still another object of the invention to provide an improved audio encoding arrangement for a subscription television system.

It is a further object to mask a plural-channel system in such a way that all intelligibility is destroyed.

A secrecy communication transmitter, embodying the invention, comprises a source of intelligence signal. Coding means, including selecting apparatus, are coupled to the source for selectively translating the intelligence signal as true information to a subscriber receiver over a plurality of different channels selected one at a time in accordance with a predetermined code schedule. Means, including delay apparatus, are coupled to both the intelligence signal source and the coding means and operates in synchronism with the operation of the coding means for instantaneously translating the intelligence signal, time delayed, as masking information to the subscriber receiver over all of the plurality of channels other than the one conveying the true information.

The features of this invention which are believed to be new are set forth with particularity in the appended claims. The invention itself, together with further objects and advantages thereof, may best be understood, however, by reference to the following description in conjunction with the accompanying drawings, in which like reference numerals identify like elements, and in which:

Figure 2:
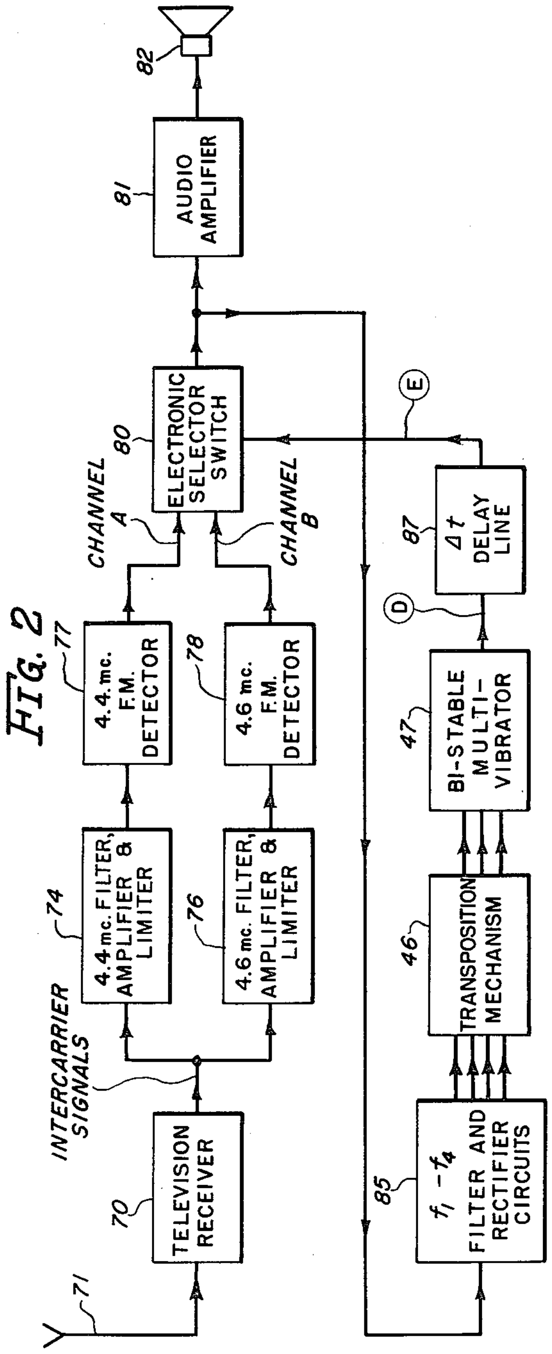
Figure 2 represents a subscription television receiver for operation in conjunction with the transmitter of Figure 1.
Figure 4:
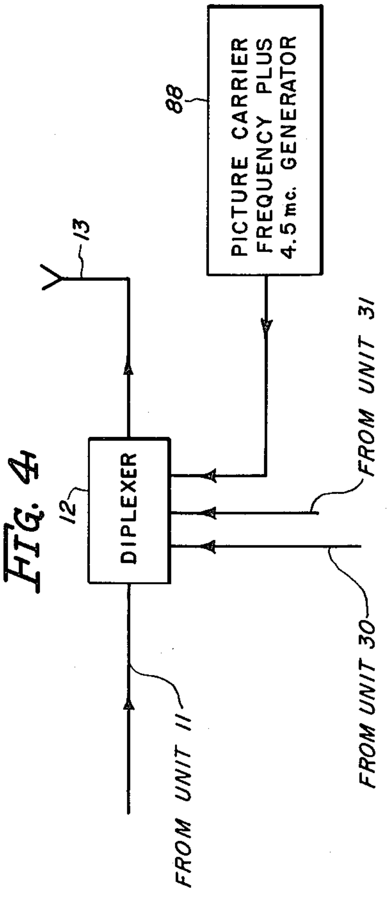
Figure 4 represents a portion of the transmitter of Figure 1 modified in accordance with another embodiment of the invention.
Figure 5:
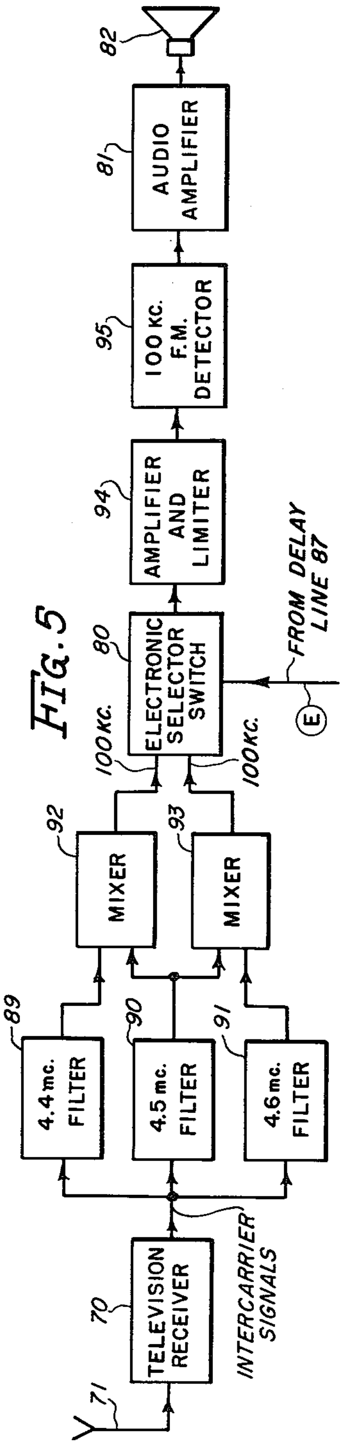
Figure 6:
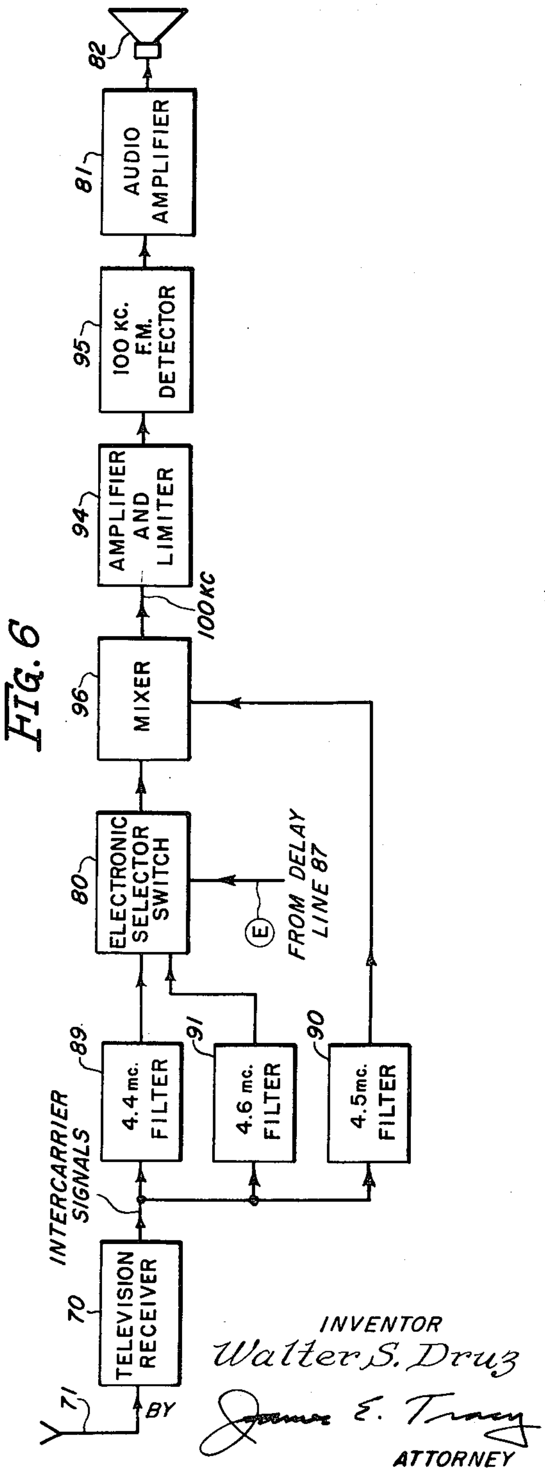

Figure 5 shows a portion of the receiver of Figure 2 modified in accordance with another embodiment of the invention for operation in conjunction with the transmitter of Figure 4; and, Figure 6 is a schematic representation of a portion of the receiver of Figure 2 modified in accordance with still another embodiment of the invention and also for utilizing the transmission from the transmitter of Figure 4.

Figure 1:
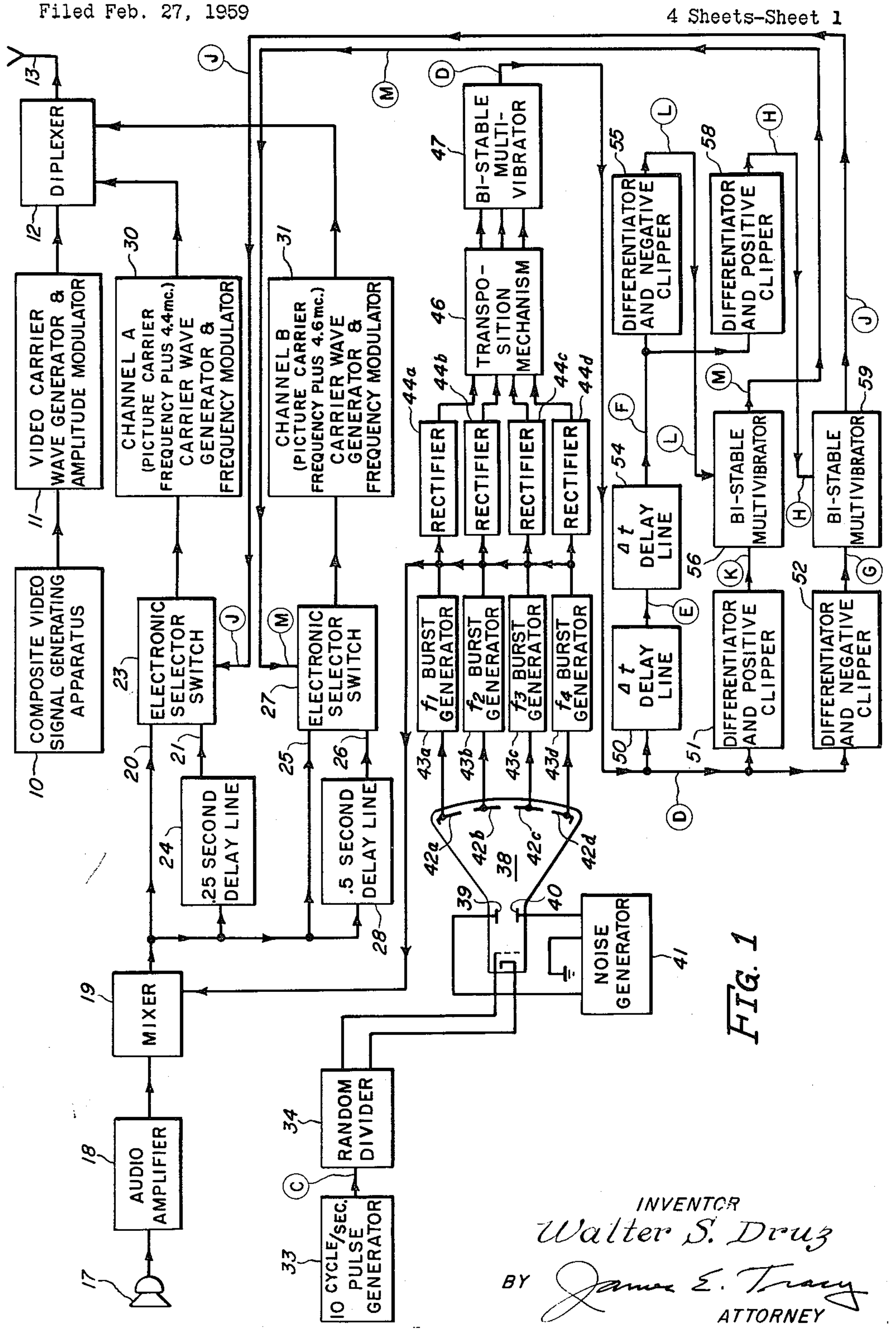
Figure 1 is a schematic representation of a subscription television transmitter constructed in accordance with one embodiment of the invention.

The subscription television transmitter of Figure 1 includes a conventional picture converting device and associated scanning apparatus for developing a video signal from an image to be televised, a video amplifier, a synchronizing signal generator for developing the usual line- and field-synchronizing pulses and associated pedestal pulses, and a mixer, all of which elements are grouped for convenience and illustrated by the single block 10. Unit 10 thus develops a composite video signal. If desired, the circuitry may include coding apparatus for introducing coding or scrambling to the video components. The output terminals of unit 10 are coupled to a video carrier wave generator and amplitude modulator 11, the output of which is coupled through a diplexer 12 to a suitable transmitting antenna 13.

The audio intelligence accompanying the image to be televised is picked up by a microphone 17 which in turn is coupled through an audio amplifier 18 to one input of a mixing device 19. A single output of mixer 19 is coupled (1) to one input 20 of a conventional electronic selector switch 23, (2) through a delay line 24, which introduces a delay of one-fourth or .25 of a second to an applied signal, to another input 21 of selector 23, (3) to one input 25 of another conventional electronic selector switch 27, and (4) through a delay line 28, which introduces a delay of one-half or .5 of a second to an applied signal, to another input 26 of selector 27. As will be described later, the operation of selectors 23 and 27 is so correlated that when the undelayed audio on input 20, which constitutes true information, is selected by selector 23, the delayed audio on input 26 is chosen by switch 27 and, vice-versa; when selector 23 selects the delayed audio on input 21, selector 27 selects the undelayed, true information on input 25. Accordingly, the signals on inputs 21 and 26 constitute masking information, and for optimum performance it is preferable in the described case to adjust the amount of delay introduced by delay lines 24 and 28 to bear a particular relationship to the syllabic rate of the audio intelligence normally accompanying a telecast. Stated differently, it is preferred that the delay times be correlated with the approximate time interval embraced by each syllable. The syllabic rate varies roughly from five to ten syllables per second; thus, the durations of the syllables vary from .1 to .2 of a second. It has been found that by selecting the particular delays as illustrated, delay line 24 introducing a delay slightly longer than the upper limit of the syllable durations and line 28 imposing a time lag twice that of line 24, excellent masking is obtained.

The delays of networks 24 and 28 may be made equal and adequate masking is achieved. However, it has been found that by doubling one with respect to the other the masking is considerably improved.

The output of selector 23 is connected to a channel A carrier wave generator and frequency modulator, illustrated as a single block 30, the output of which is connected to another input of diplexer 12. The frequency of the channel A sound carrier is selected to be 4.4 megacycles higher than the picture or video carrier frequency, whatever that may be. The output of selector 27 is coupled to a channel B carrier wave generator and frequency modulator 31, the output terminals of which are coupled to another input circuit of diplexer 12. Channel B differs from channel A in that its carrier wave frequency is selected to be 4.6 megacycles higher than the picture carrier frequency. It will be made apparent subsequently that 4.4 and 4.6 megacycles have been selected as the amount by which the two sound channels differ from the video carrier frequency in order that conventional intercarrier sound techniques may be employed in the subscriber receivers. Making channel A and channel B carrier frequencies relatively close insures that any noise superimposed on the signals in case of poor transmission conditions is the same for the program or true information translated over channel A as that translated over channel B. This avoids objectionable pulsed hiss which may otherwise be created.

In order to provide actuating or selecting signals for switches 23 and 27, a pulse generator 33 produces sharply defined, periodically recurring timing pulses at a rate of ten per second. The output of pulse generator 33 is connected to a random frequency divider 34 which may be constructed in a manner disclosed in patent 2,588,413, issued March 11, 1952, in the name of Erwin M. Roschke, and assigned to the present assignee. The output terminals of the divider are connected to the input electrodes of a beam-deflection device or cathode ray commutator 38 in order to modulate the electron beam therein, energizing or turning it on for the duration of each applied random signal pulse. Beam-deflection device 38 includes a pair of deflection elements 39, 40 which are connected to the output terminals of a noise generator 41. Unit 41 produces a signal having an amplitude characteristic that varies in random fashion from one operating instant to the next. An alternating beam-deflection field is thus established within mechanism 38 having a peak-to-peak amplitude sufficient to sweep the beam (if it is energized) back and forth across a family of anode segments 42a—42d at a rate corresponding to the instantaneous frequency of the output signal of noise generator 41. Because of the employment of the multiplicity of segmental anodes *42a*—*42d* in conjunction with the pair of deflection elements 39, 40 which respond to an amplitude characteristic of an applied actuating or deflection signal from noise source 41 for directing the electron beam from one to another of the segmental anodes, beam-deflection device 38 is effectively actuated between a corresponding multiplicity of operating conditions.

The load circuits for the several segmental anodes *42a*—*42d* are completed through control circuits of a series of code burst generators *43a*—*43d* respectively. This coupling from the anode elements to the burst generators permits each generator to be turned on or energized by a current pulse resulting from the impingement of the beam in device 38 upon the associated segmental anode. Each of the signal generators *43a*—*43d* includes a cyling or timing feature in the manner of a blocking oscillator or other monostable generator or the like to determine the duration of the interval during which the generator is energized in order that the output obtained therefrom may have a selected duration, exceeding the duration of the current pulse delivered by its associated anode segment. In the particular embodiment illustrated, it will be assumed that when any of generators *43a*—*43d* is energized it produces a signal burst of a duration of approximately 1/50 of a second or twenty milliseconds. Each of generators *43a*—*43d* has a distinct, super audible assigned operating frequency as indicated by the indicia $f_1$—$f_4$ to facilitate frequency selection or separation of the code bursts at a subscriber receiver, as will be explained.

The respective areas of the segmental anodes are preferably so chosen that each receives the same average current as the electron beam is swept under the control of the signal applied to deflection elements 39, 40. The beam is thus directed to each of the anodes for an equal proportion of each program interval and has a substantially equal probability of impinging on any one of the four anodes each time the beam is gated on under the control of unit 34.

The circuitry of elements 33–*43d* actually constitutes a combination of two different code generators, one of which is shown in copending application Serial No. 310,309 filed September 18, 1952, in the name of Alexander Ellett, and assigned to the present assignee, and the other of which is disclosed in Patent 2,823,252, issued to Jack E. Bridges on February 11, 1958, also assigned to the present assignee.

The output circuits of generators *43a*–*43d* are all connected in common and to another input of mixer 19 to facilitate the transmission of the code bursts to the subscriber receivers along with the coded audio intelligence. Additionally, generators *43a*–*43d* are connected through a series of rectifiers *44a*–*44d*, respectively, to different assigned input circuits of an adjustable tranposition or switching mechanism 46. Transposition mechanism 46 selectively establishes a pattern of circuit connections or a permutation pattern, as determined by the particular instantaneous adjustment of the mechanism, between its input circuits and three output circuits coupled in turn to various inputs of a multi-stable actuating device such as a bi-stable multivibrator 47 comprising the usual two cross-coupled triodes, not shown. One of the outputs of the transposition mechanism is coupled to the control grid of one of the triodes so that the multivibrator is actuated to one of its two stable operating conditions in response to pulses applied from that output circuit, another output from switching mechanism 46 is coupled to the control grid of the other triode in order to actuate multivibrator 47 to the other one of its operating conditions in response to pulses applied over that circuit, and the third output circuit from unit 46 is coupled to the control grid of each triode so that the multivibrator is actuated from its instantaneous or present condition, whatever one that may be, to its other or alternate condition in response to pulses applied from that third output.

Accordingly, bi-stable multivibrator 47 is actuated in a sequence prescribed by the occurrence and order of the bursts from generators 43*a*—43*d*, shifting from one to the other of its two stable operating conditions at random. The circuitry of units 44*a*—44*d*, 46 and 47 is also shown in detail in the aforementioned Bridges Patent 2,823,252.

The output terminals of bi-stable multivibrator 47 are connected to (1) the input of a $\Delta t$ delay line 50, (2) a differentiator and positive clipper 51, and (3) a differentiator and negative clipper 52. The output of delay line 50 is coupled to another $\Delta t$ delay line 54. Each of the delay lines in the illustrated case is adjusted to introduce a time delay to an applied signal of approximately 1/100 of a second or 10 milliseconds. The output of delay line 54 is connected through a differentiator and clipper 55 to one input of a conventional bi-stable multivibrator 56, another input circuit being connected to the output of differentiator and positive clipper 51. The output terminals of network 54 are also coupled to a differentiator and positive clipper 58 which in turn is connected to one input of another conventional bi-stable multivibrator 59, the output terminals of differentiator and negative clipper 52 being connected to another input of multivibrator 59. The output circuits of multivibrators 56 and 59 are connected respectively to selector switches 27 and 23 to provide selecting signals therefor in order to determine the make-up of the signals translated to units 30 and 31.

Turning now to an operational description of the transmitter of Figure 1, unit 10 develops a composite video signal, either coded or uncoded depending on whether or not video coding apparatus is employed, and supplies this composite video signal to unit 11 wherein it is amplitude modulated in conventional manner on a carrier wave exhibiting a predetermined carrier frequency. The video information is thus translated through diplexer 12 to antenna 13 from which it is radiated, employing the video carrier as a vehicle to the subscriber receivers in a well known fashion.

Meanwhile, microphone 17 produces an intelligence or audio signal, constituting the true information, for application to amplifier 18 wherein it is amplified and supplied to mixer 19 and in turn to the various inputs of selector switches 23 and 27, one input (21 and 26) of each of the switches receiving the intelligence signal time delayed. The selecting apparatus comprising switches 23 and 27 is operated in response to selecting signals, the development of which is to be explained, to translate the audio intelligence to units 30 and 31 in both true, undelayed form and false or delayed form to constitute masking information. Units 30 and 31 operate to effect a frequency modulation of assigned sound carrier waves which are subsequently translated through diplexer 12 for radiation to subscriber receivers via antenna 13.

Figure 3:
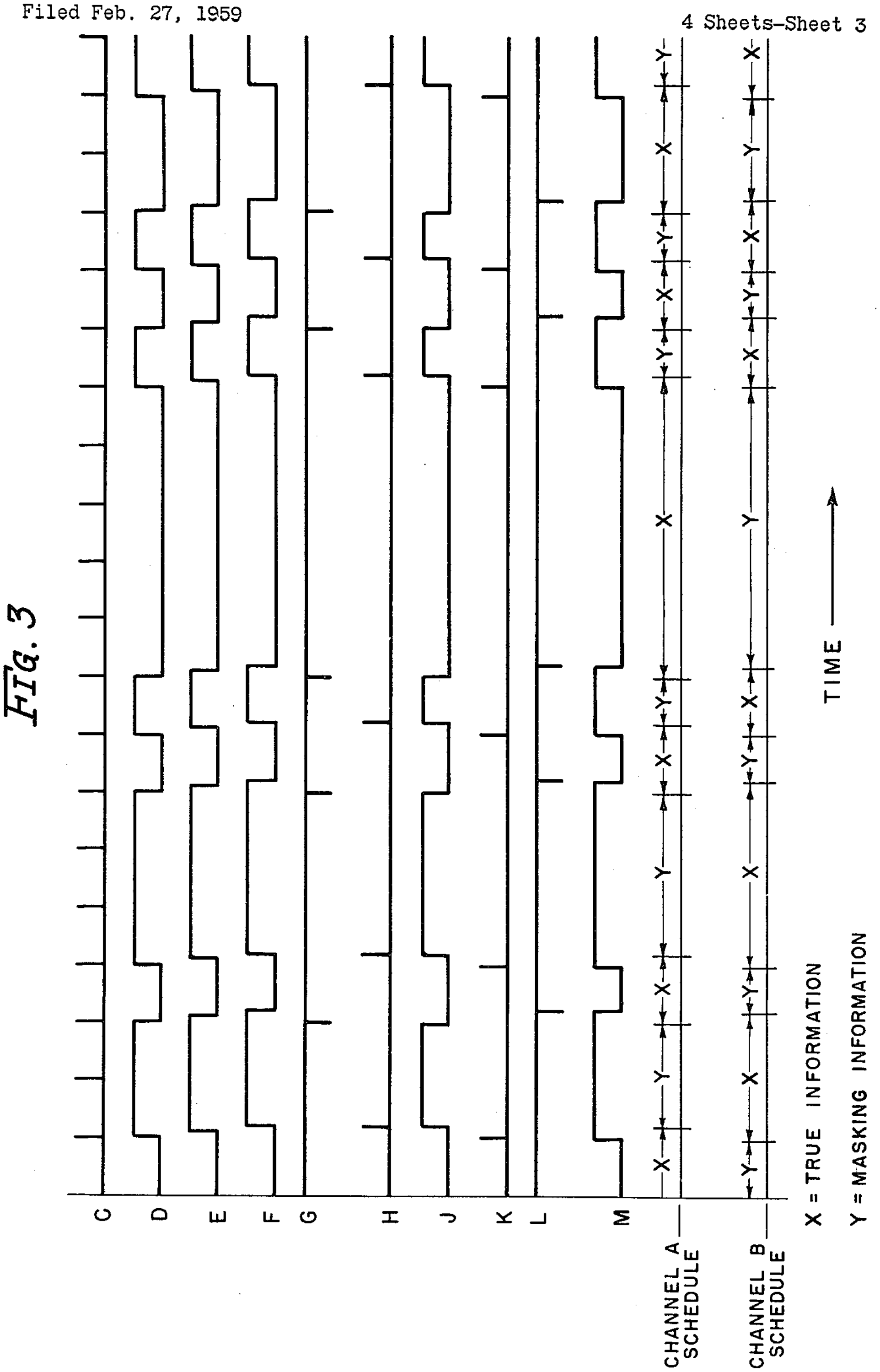
Figure 3 illustrates a series of signal waveforms plus two timing schedules, correlated with the signal wave forms, all of which are helpful in explaining the operation of the transmitter and receiver in Figures 1 and 2.

To aid in explaining the manner in which selecting signals for switches 23 and 27 are developed, reference is made to the signal wave forms and timing schedules of Figure 3, the wave forms of which are found at various points in Figure 1 as indicated by the encircled letter designations corresponding to the letter indicia adjacent the curves in Figure 3. Generator 33 operates in cyclic fashion to produce a series of sharply defined pulses, as shown by curve C, occurring at the rate of ten cycles per second. Thus, the time separation between successive pulses in curve C equals 100 milliseconds. Random divider 34 effects a random division of the pulses of curve C, thereby effectively deleting or removing some of them so that the beam of commutating device 38 is rendered conductive in random fashion. Noise generator 41 effects sweeping of anodes 42*a*—42*d* with the electron beam, when it is turned on, also in an irregular manner to cause random actuation of burst generators 43*a*—43*d*. The bursts are contained within a bandwidth small relative to the audio frequency range in order not to introduce distortion when the bursts are modulated on the carrier.

The code bursts developed, after rectification in rectifiers 44*a*—44*d*, are channeled through transposition mechanism 46 in accordance with the permutation pattern determined by its instantaneous adjustment in order to trigger bi-stable multivibrator 47 back and forth to produce the rectangular shaped signal of waveform D having amplitude excursions occurring at irregular times. Such amplitude variations represent a code schedule according to which the audio is coded, as will be described hereinafter. It will be noted that each amplitude excursion of waveform D coincides with one of the pulses of curve C. This is due to the fact that random divider 34 only removes some of the applied pulses rather than change the timing of the pulses.

It is assumed in the illustrated case that the multivibrator is actuated responsive to the very beginning of each burst as also shown by the coincidence between the pulses of curve C, which indicate the starting times for the bursts, and the amplitude excursions of waveform D, although in practice the multivibrator would not trip until the rectified envelopes of the bursts developed in rectifiers 44*a*—44*d* reach a predetermined level.

Waveform D has been shown as being typical in that the time separations between its amplitude excursions vary from 100 milliseconds or one-tenth of a second to 500 milliseconds or one-half of a second. As will be explained, the signal of waveform D with only a slight modification is employed to operate selectors 23 and 27 and for optimum performance in order to achieve maximum scrambling, it is desirable that the actuation of the selectors proceed at an average rate which may be adjusted or controlled. Accordingly, the time separations between the amplitude excursions of waveform D may be varied by adjusting the operating characteristics of generators 33 and 41 and random divider 34 to accomplish optimized disruption of the audio signal.

The code bursts are combined in mixer 19 with the true audio intelligence for transmission to subscriber receivers. It will be seen later that a signal having the waveshape of curve D is developed in the receiver of Figure 2 responsive to the code bursts. However, because of slight inherent time delays usually introduced between the occurrence of the code bursts in the receiver and the amplitude excursions of a signal of waveshape D, it is difficult in a commercial system to duplicate precisely the signal of curve D at a receiver, phase-wise, with the corresponding signal in the transmitter. Thus, if the signal of waveform D is directly employed at the transmitter for operating the selectors and corresponding signals are developed at the various authorized receivers for operating companion selectors to be described, non-synchronous operation may result.

Accordingly, it is desirable to operate the selectors in such a way that there is an overlap each time the true information switches channels, namely changes from channel A to channel B or vice-versa, so that for a relatively short interval the true information is present on both channels. In this way, it is not imperative that each subscriber receiver switch channels at a precise instant to derive the true information since there is effectively a broad tolerance provided. In order to achieve such overlap operation, waveform D is delayed in $\Delta t$ delay line 50 for a ten milliseconds interval to produce the signal of curve E for translation through $\Delta t$ delay line 54 wherein it is subjected to an additional delay of ten milliseconds to develop the signal of waveform F. Meanwhile, differentiator and negative clipper 52 differentiates the signal of waveform D and clips off the negative differentiated pulses for application to bi-stable multivibrator 59 as shown by curve G. Circuit 58 differentiates the signal of waveform F and clips off the positive differentiated pulses as shown by waveform H for application to multivibrator 59. This multivibrator thus triggers back and forth in response to each of the pulses of curves G and H to provide the rectangularly shaped signal of curve J.

At the same time, unit 51 differentiates the signal of curve D and translates only the positive differentiated pulses to multivibrator 56, as shown by waveform K, while circuit 55 differentiates the signal of curve F and passes the negative differentiated pulses (curve L) to multivibrator 56. This multivibrator likewise triggers back and forth in response to each of the pulses of curves K and L to produce the rectangular shaped signal of curve M.

By comparing waveforms J and M it will be noted that the positive components of curve M overlap, with about twenty milliseconds to spare on each side, the positive pulse components of the signal of curve J. Conversely, the negative pulse components of the signal of curve J overlap in like fashion the negative components of the signal of waveform M.

The signal of waveform J, which serves as a selecting signal for switch 23, therefore actuates selector 23 in order to alternately translate the true, undelayed intelligence signal on input 20 and the intelligence signal, time delayed, appearing on input 21 to channel A carrier wave generator and frequency modulator 30. For convenience, the schedule of channel A, resulting from the actuation of selector 23 by the signal of curve J, has been shown on the bottom of Figure 3, with the letter X designating the intervals in which the selector selects the true information on input 20 and the letter Y indicating the intervals when selector 23 chooses the masking information on input 21 for translation to each subscriber receiver. By comparing the channel A schedule with curve J, it will be noted that the positive pulse components are effective to condition the selector so that the audio is routed through delay line 24 to unit 30 whereas the negative pulse components of curve J are effective to channel the output of mixer 19 directly to unit 30 without introducing any appreciable delay.

Similarly, the signal of waveform M is utilized to actuate selector switch 27 to alternately translate the audio on input 25 and the masking, delayed audio, on input 26 to channel B carrier wave generator and frequency modulator 31. The channel B schedule has also been shown on the bottom of Figure 3 and it will be observed that the operation of switch 27 is correlated with that of switch 23 so that the positive pulse components of curve M select the true information, namely the audio from mixer 19 without any delay, whereas the negative pulse components of curve M actuate selector 27 such that the intelligence or audio signal which is time delayed in delay line 28 is routed to unit 31. Switches 23 and 27 in a sense are operated in push-pull fashion.

By comparing the channel A and channel B schedules, it is seen that there is a definite overlap of approximately twenty milliseconds each time the true information is switched to the other channel. Thus, the receiver is given a wide tolerance or latitude in which to make a transition from channel A to channel B or vice-versa.

To recapitulate, Figure 1 illustrates a secrecy communication transmitter, specifically in the form of a subscription television transmitter, comprising a source of intelligence or audio signal, namely elements 17—19. All of elements 33—59 and selectors 23 and 27 constitute coding means, including selecting apparatus, coupled to the intelligence signal source for selectively translating the intelligence signal as true information to a subscriber receiver over a plurality of different channels (facilitated by units 30, 31, 12 and 13) selected one at a time in accordance with a predetermined code schedule. Finally, delay lines 24 and 28 and selectors 23 and 27 may be considered means, including delay apparatus, coupled to both the intelligence signal source and to the coding means and operated in synchronism with the operation of the coding means for instantaneously translating the intelligence signal, time delayed, as masking information to the subscriber receiver over all of the plurality of channels other than the one conveying the true information.

The receiver of Figure 2, which is constructed to utilize the transmission from the transmitter of Figure 1, includes conventional television receiving circuitry such as an RF amplifier, a first detector, one or more IF amplifiers, a second detector, a video amplifier, a picture tube or image reproducer and associated vertical and horizontal scanning systems, all of which is conveniently shown as being incorporated in a single block 70 having its input circuit connected to a receiving antenna 71. Of course, if the transmitter of Figure 1 includes video scrambling or coding apparatus, corresponding decoding apparatus would be incorporated in unit 70 to achieve picture unscrambling.

Television receiver 70 is of the conventional intercarrier type wherein the picture and sound carriers are effectively beat together to develop a beat signal, customarily called an intercarrier signal, having a frequency equal to the difference between the two carriers and containing the audio information as a frequency modulation of that intercarrier signal. Since there are two sound carriers conveyed by the transmitter of Figure 1, two rather than one intercarrier signals are developed in the video amplifier portion of television receiver 70, one exhibiting a frequency of 4.4 megacycles, representing channel A, and the other having a frequency of 4.6 megacycles representing channel B. Accordingly, a combination filter for selecting the 4.4 megacycle intercarrier, and amplifier and a limiter is connected to the video amplifier of television receiver 70 as indicated by the single block 74, while a corresponding combination of a 4.6 megacycle intercarrier filter, an amplifier and a limiter, as represented by block 76, is also connected to the video amplifier portion of receiver 70. In order to demodulate the information conveyed by both of the channels, a 4.4 megacycle frequency modulation detector 77 is coupled to the output of unit 74 and a 4.6 megacycle frequency modulation detector 78 is coupled to the output of unit 76. A single electronic selector switch 80 has one input connected to the output terminals of detector 77 and another input connected to the output of selector 78. The output terminals of selector 80 are coupled through an audio amplifier 81 to a speaker 82.

The output of selector 80 is also coupled to a series of four filter and rectifier circuits, grouped for convenience in a single block 85, each of which circuit responds to an assigned one of the four frequencies $f_1$—$f_4$ to separate the code bursts from the audio signal and also from one another. Incidentally, it is not necessary to add the code bursts to the audio signal before coding as is done in Figure 1. Alternately, the code bursts from generators *43a*—*43d* may be applied to one channel only, such as channel A. In that case, the outputs of the generator are connected directly to the output of selector 23. The receiver of Figure 2 would then have to be modified by connecting the input of unit 85 to the output of detector 77, rather than to the output of selector 80.

The output terminals of the four filter and rectifier circuits in unit 85 are connected respectively to assigned input circuits of an adjustable transposition or switching mechanism 46 which corresponds to the identically numbered mechanism in the transmitter. Decoding can be accomplished only if the various interconnections established by switching mechanism 46 in the receiver are identical to the corresponding interconnections established by the transposition mechanism in the transmitter. The necessary information for manually setting the transposition mechanism is disseminated only to authorized subscribers and a suitable charge may, of course, be assessed for such information.

As in the transmitter, the output circuits of transposition mechanism 46 in Figure 2 are coupled to the various input circuits of a multivibrator 47 which, of course, constitutes the counterpart of the correspondingly numbered multivibrator in the transmitter. Multivibrator 47 in the receiver is coupled through a $\Delta t$ delay line 87 to another input of selector 80 to provide a selecting signal therefor. Delay line 87 is adjusted to introduce a delay to an applied signal equal to that introduced by delay line 50 in the transmitter, which is approximately ten milliseconds in the illustrated case.

In the operation of the receiver of Figure 2, the coded television signal is intercepted by antenna 71, and applied to television receiver 70 wherein it is subjected to conventional television receiving operations. In accordance with well known intercarrier sound principles, the video amplifier portion of receiver 70 develops difference or beat signals between the video and sound carriers. In the particular case, since two different sound carriers are employed, two difference or intercarrier signals are developed, one having a frequency of 4.4 megacycles and the other having a frequency of 4.6 megacycles, conveying the information translated over channels A and B respectively. Unit 74 separates the 4.4 megacycle intercarrier signal, amplifies and limits it, whereas unit 76 functions in the same manner with respect to the 4.6 megacycle intercarrier signal. Detectors 77 and 78 detect the information translated by the 4.4 megacycle and 4.6 megacycle intercarrier signals, respectively, such that the channel A and channel B information are supplied to separate inputs of selector 80.

The code signal bursts of frequencies $f_1$—$f_4$ are developed in the output of selector 80 and applied to filter and rectifier circuits 85. Since the filter and rectifier units are individually tuned to an assigned one of the four frequencies, such bursts are separated from the audio information and from each other. If transposition mechanism 46 in the receiver is adjusted to the same setting as the corresponding switching mechanism at the transmitter, the inputs of bi-stable multivibrator 47 in the receiver receive rectified bursts similar to those received by the input circuits of the corresponding multivibrator at the transmitter. Multivibrator 47 in the receiver therefore produces a rectangularly shaped selecting signal which is identical in waveform to that developed at the transmitter, namely to curve D.

Inasmuch as intervals of overlap between true and masking information were purposely introduced in the operation of the transmitter of Figure 1 in order to obviate the need for precise synchronism in the operation of the receiver, the output of multivibrator 47 in the receiver of Fig. 2 is delayed in delay line 87 so that a signal having the phase approximately represented by waveform E is developed for application to selector 80. By comparing the amplitude excursions of waveform E with the periods of overlap as indicated in the channel A and channel B schedules in Figure 3, it will be noted that each of such amplitude excursions appears approximately in the center of an overlap region. Thus, selector 80 is operated in such a manner that the true information, no matter on what channel it is instantaneously found, is selectively translated to audio amplifier 81 for subsequent application to speaker 82, while at the same time the masking information is effectively deleted. This means that multivibrator 47 in the receiver must be so connected to selector 80 that the positive portions of waveform E causes the translation of channel B to amplifier 81 and negative portions of curve E effect the translation of channel A to amplifier 81. In this way, a completely unscrambled audio signal is reproduced in speaker 82.

Since switching in selector 80 is effected on audio frequency signals, it is possible that undesirable switching pulses or spikes may manifest themselves. Additionally, it is important that the amplitudes of the two channels be made identical in order to avoid flutter of the recovered program or true information. The system of Figures 4 and 5 is calculated to overcome these disadvantages. The transmitter of Figure 1 is modified as shown in Figure 4 merely by effectively adding a third unmodulated channel, called a pilot signal, to the television transmission. Specifically, unit 88 is provided to generate a pilot signal for application to diplexer 12 having a frequency equal to the picture carrier frequency plus 4.5 megacycles. With this arrangement, the pilot signal lies frequency-wise midway between the sound carrier waves of channels A and B.

The receiver of Figure 5 is modified from that shown in Figure 2 by applying the output of the video amplifier in unit 70, which output now develops three intercarrier signals, to three filters 89, 90, 91 for filtering out the 4.4, 4.5 and 4.6 megacycle signals, respectively. The 4.4 and 4.6 megacycle signals, of course, are frequency modulated and contain both true and masking information, whereas the 4.5 megacycle pilot signal is unmodulated. The output of filter 89 is connected to one input of a mixer 92 and the output of filter 91 is connected to one input of a mixer 93, the output of filter 90 being connected to separate inputs of both mixers 92 and 93. Mixer 92 adds the 4.4 and 4.5 megacycle signals together to develop a beat signal having a frequency of 100 kilocycles. This beat signal is frequency modulated with the same masking and true information conveyed by means of the 4.4 megacycle intercarrier, namely channel A. At the same time, mixer 93 beats the 4.5 megacycle pilot signal with the 4.6 megacycle intercarrier to develop another beat signal having a frequency of 100 kilocycles and containing the true and masking information conveyed by means of the 4.6 megacycle intercarrier, namely channel B.

The outputs of mixers 92 and 93 are connected to separate inputs of electronic selector switch 80, which responds to the decoding signal (curve E) from delay line 87 to selectively translate the two 100 kilocycle beat signals to an amplifier and limiter 94. Selector 80, of course, operates in synchronism with the operation of the transmitter so that the channel instantaneously containing the true information is passed on to amplifier and limiter 94, whereas the masking information is effectively discarded.

A 100 kilocycle frequency modulation detector 95 is coupled to unit 94 in order to remove the 100 kilocycle component and develop the original audio information in unscrambled form for application to amplifier 81 and thence to speaker 82.

With the arrangement of Figures 4 and 5, it will be noted that switching is achieved between two relatively high frequency signals (100 kilocycles) and thus any amplitude difference that may exist between the two channels is removed after switching by amplifier and limiter 94. Additionally, if any switching spikes or transients are developed in the decoding process, they appear as amplitude modulation pulses on a frequency modulated signal and thus are limited or removed in unit 94.

The receiver illustrated in Figure 6 represents a modification over that shown in Figures 2 and 5 and achieves substantially the same results. The receiver of Figure 6 is attractive in that it contains fewer components. Specifically, the channel A and channel B intercarrier signals developed in filters 89 and 91 are supplied directly to selector switch 80, the intercarrier signal on which the true information is frequency modulated always appearing in the output of selector 80 for application to a mixer 96. Meanwhile, the output of filter 90 which selects the 4.5 intercarrier pilot signal is supplied directly to another input of mixer 96. Since the signal appearing in the output of selector 80 will instantaneously have a frequency component of either 4.4 or 4.6 megacycles, there will always be a 100 kilocycle beat between the two input signals to the mixer. Thus, a 100 kilocycle beat signal is supplied to amplifier and limiter 94 and this signal contains all of the true information with none of the masking information. Units 94, 95, and 81 in Figure 6 function in response to this 100 kilocycle signal in the same manner as in the receiver in Figure 5 to supply the original uncoded audio information in speaker 82. It will be noted that the arrangement of Figure 6 is an improvement over that in Figure 5 in that one mixer has been deleted.

The invention provides, therefore, a secrecy communication system wherein the intelligence signal, with no appreciable delay, is selectively translated to a subscriber receiver over a plurality of different channels while at the same time the intelligence signal, time delayed, is also translated to the subscriber receiver over all of the channels other than the one conveying the true information. As shown, only two channels have been illustrated as conveying the intelligence signal, but of course the invention may be applied to the case where more than two channels are employed.

While particular embodiments of the invention have been shown and described, modifications may be made, and it is intended in the appended claims to cover all such modifications as may fall within the true spirit and scope of the invention.

I claim:

1. A secrecy communication transmitter comprising: a source of intelligence signal; coding means, including selecting apparatus, coupled to said source for selectively translating said intelligence signal as true information to a subscriber receiver over a plurality of different channels selected one at a time in accordance with a predetermined code schedule; and means, including delay apparatus, coupled to both said source and said coding means and operated in synchronism with the operation of said coding means for instantaneously translating said intelligence signal, time delayed, as masking information to said subscriber receiver over all of said plurality of channels other than the one instantaneously conveying the true information.

2. A secrecy communication transmitter comprising: a source of intelligence signal; selecting apparatus coupled to said source and responsive to an applied selecting signal for selectively translating said intelligence signal as true information to a subscriber receiver over a plurality of different channels selected one at a time; means for developing a selecting signal having characteristic variations representing a predetermined code schedule; means for applying said selecting signal to said selecting apparatus, said selecting apparatus thereby effecting selective translation of said intelligence signal over said plurality of channels in accordance with said code schedule; and means, including delay apparatus, coupled to both said source and said selecting apparatus and operated in synchronism with the operation of said selecting apparatus for instantaneously translating said intelligence signal, time delayed, as masking information to said subscriber receiver over all of said plurality of channels other than the one instantaneously conveying the true information.

3. A secrecy communication transmitter comprising: a source of intelligence signal; first and second time delay means coupled to said source; first and second channels; and means coupled to said delay means and said channels and operated in accordance with a predetermined code schedule for applying said intelligence signal during certain time intervals to said first channel and concurrently through said second time delay means to said second channel and during other time intervals to said second channel and concurrently through said first delay means to said first channel.

4. A secrecy communication transmitter comprising: a source of intelligence signal; first and second time delay means coupled to said source, one of which exhibits a longer delay characteristic than the other; first and second channels; and means coupled to said delay means and said channels and operated in accordance with a predetermined code schedule for applying said intelligence signal during certain intervals to said first channel and concurrently through said second time delay means to said second channel and during other time intervals to said second channel and concurrently through said first delay means to said first channel.

5. A secrecy communication transmitter comprising: a source of intelligence signal; a first selector for translating applied input signals to a subscriber receiver over a predetermined one of a plurality of different channels; a plurality of coupling circuits between said source and said first selector at least one of which supplies the intelligence signal to said first selector with no appreciable time delay while at least one other of which includes a first delay device for supplying said intelligence signal to said first selector with a predetermined time delay; a second selector for translating applied input signals to said subscriber receiver over a different one of said plurality of channels; a plurality of coupling circuits between said source and said second selector at least one of which supplies said intelligence signal to said second selector with no appreciable time delay while at least one other of which includes a second delay device for supplying said intelligence signal to said second selector with a predetermined time delay different from that introduced by said first delay device; and means for actuating said selectors in synchronism and in accordance with a predetermined code schedule, said intelligence signal, undelayed, thereby being translated through said selectors in alternation to convey true information to said subscriber receiver over said channels selected one at a time in accordance with said code schedule, and said intelligence signal, time delayed, being translated through said selectors also in alternation to introduce masking information on all of said channels other than the one conveying the true information.

6. A secrecy communication transmitter comprising: a source of audio signal; first and second time delay means coupled to said source; first and second channels, each of which includes means for developing a frequency modulated sound carrier of a predetermined, different carrier frequency to transmit an applied signal; and means coupled to said delay means and said channels and operated in accordance with a predetermined code schedule for applying said audio signal during certain time intervals to said first channel and concurrently through said second time delay means to said second channel and during other time intervals to said second channel and concurrently through said first delay means to said first channel.

7. A secrecy communication transmitter comprising: a source of audio signal; first and second time delay means coupled to said source; first and second channels, each of which includes means for developing a frequency modulated sound carrier of a predetermined, different carrier frequency to transmit an applied signal; means for transmitting a continuous, unmodulated pilot carrier having a frequency approximately midway of said sound carrier frequencies; and means coupled to said delay means and said channels and operated in accordance with a predetermined code schedule for applying said audio signal during certain time intervals to said first channel and concurrently through said second time delay means to said second channel and during other time intervals to said second channel and concurrently through said first delay means to said first channel.

8. A secrecy communication receiver for utilizing a first carrier modulated during certain time intervals determined in accordance with a code schedule with uncoded intelligence, a second carrier having a different carrier frequency than that of said first carrier and modulated during other time intervals also determined in accordance with said code schedule with uncoded intelligence, and a pilot carrier having a frequency approximately midway of said first and second carrier frequencies, said receiver comprising: means for deriving first, second and pilot intermediate signals corresponding respectively to the differences between the frequencies of said first carrier, said second carrier and said pilot carrier with respect to a reference frequency; decoding means, including selecting apparatus operated in accordance with said code schedule, coupled to said deriving means for developing the beat signal of said first intermediate signal and said pilot intermediate signal during said certain intervals and the beat signal of said second intermediate signal and said pilot intermediate signal during said other time intervals; and a demodulator coupled to said decoding means for demodulating said beat signals to recover said uncoded intelligence.

9. A subscription television receiver for utilizing a received television signal including an amplitude modulated picture carrier, a first sound carrier having a different carrier frequency than that of said picture carrier and frequency modulated during certain time intervals determined in accordance with a code schedule with uncoded audio, a second sound carrier having a different carrier frequency than that of said first sound carrier and frequency modulated during other time intervals also determined in accordance with said code schedule with uncoded audio, and a pilot carrier having a frequency approximately midway of said sound carrier frequencies, said receiver comprising: means for deriving first, second and pilot intercarrier signals corresponding respectively to the differences between the frequencies of said first sound carrier, said second sound carrier and said pilot carrier with respect to said picture carrier; decoding means, including selecting apparatus operated in accordance with said code schedule and mixing apparatus, coupled to said deriving means for developing a beat frequency component equal to the separation of said pilot carrier from said first and second carriers and containing all of said uncoded audio conveyed by said first and second sound carriers; and a frequency modulation detector coupled to said decoding means for demodulating said beat frequency component to recover said uncoded audio.

10. A subscription television receiver for utilizing a received television signal including an amplitude modulated picture carrier, a first sound carrier having a different carrier frequency than that of said picture carrier and frequency modulated during certain time intervals determined in accordance with a code schedule with uncoded audio, a second sound carrier having a different carrier frequency than that of said first sound carrier and frequency modulated during other time intervals also determined in accordance with said code schedule with uncoded audio, and a pilot carrier having a frequency approximately midway of said sound carrier frequencies, said receiver comprising: means for deriving first, second and pilot intercarrier signals corresponding respectively to the differences between the frequencies of said first sound carrier, said second sound carrier and said pilot carrier with respect to said picture carrier; decoding means, including selecting apparatus operated in accordance with said code schedule and mixing apparatus, coupled to said deriving means for developing the beat signal of said first intercarrier signal and said pilot intercarrier signal during said certain intervals and for developing the beat signal of said second intercarrier signal and said pilot intercarrier signal during said other time intervals; and a frequency modulation detector coupled to said decoding means for demodulating said beat signals to recover said uncoded audio.

11. A subscription television receiver for utilizing a received television signal including an amplitude modulated picture carrier, a first sound carrier having a different carrier frequency than that of said picture carrier and frequency modulated during certain time intervals determined in accordance with a code schedule with uncoded audio, a second sound carrier having a different carrier frequency than that of said first sound carrier and frequency modulated during other time intervals also determined in accordance with said code schedule with uncoded audio, and a pilot carrier having a frequency approximately midway of said sound carrier frequencies, said receiver comprising: means for deriving first, second and pilot intercarrier signals corresponding respectively to the differences between the frequencies of said first sound carrier, said second sound carrier and said pilot carrier with respect to said picture carrier; means coupled to said deriving means for mixing said first intercarrier signal with said pilot intercarrier signal to develop a first beat signal and for mixing said second intercarrier signal with said pilot intercarrier signal to develop a second beat signal; a frequency modulation detector; and selecting means operated in accordance with said code schedule coupled to said mixing means and said frequency modulation detector for supplying said first beat signal to said frequency modulation detector during said certain time intervals and said second beat signal to said detector during said other time intervals.

12. A secrecy communication receiver for utilizing a first sound carrier modulated during a first series of spaced time intervals determined in accordance with a code schedude with uncoded audio, a second sound carrier having a different carrier frequency than that of said first sound carrier and modulated, during a second series of spaced intervals interleaved with and overlapping said first series of spaced intervals and also determined in accordance with said code schedule, with uncoded audio, and a pilot carrier having a frequency approximately midway of said sound carrier frequencies, said receiver comprising: means for deriving first, second and pilot intermediate signals corresponding respectively to the differences between the frequencies of said first sound carrier, said second sound carrier and said pilot carrier with respect to a reference frequency; decoding means, including selecting apparatus operated during overlapping portions of said interleaved first and second series of spaced intervals, coupled to said deriving means for developing the beat signal of said first intermediate signal and said pilot intermediate signal during said first series of intervals and the beat signal of said second intercarrier signal and said pilot intercarrier signal during said second series of time intervals; and a demodulator coupled to said decoding means for demodulating said beat signals to recover said uncoded audio.

13. A secrecy communication transmitter comprising: a source of intelligence signal; first and second time delay means coupled to said source; first and second channels; and selecting means coupled to said delay means and said channels and operated in accordance with a predetermined code schedule for applying said intelligence signal during a first series of spaced intervals to said first channel and concurrently through said second time delay means to said second channel and during a second series of spaced intervals interleaved with and overlapping said first series of spaced intervals to said second channel and concurrently through said first delay means to said first channel.

References Cited in the file of this patent

UNITED STATES PATENTS

| | | |
|---|---|---|
| 2,539,556 | Steinberg | Jan. 30, 1951 |
| 2,875,270 | Wendt | Feb. 24, 1959 |

FOREIGN PATENTS

| | | |
|---|---|---|
| 261,847 | Great Britain | Nov. 29, 1926 |
| 663,511 | Germany | Aug. 8, 1938 |